US012608831B2

(12) United States Patent
Guo et al.

(10) Patent No.: US 12,608,831 B2
(45) Date of Patent: Apr. 21, 2026

(54) IMAGE PROCESSING METHOD, AN APPARATUS, AN ELECTRONIC DEVICE, AND A STORAGE MEDIUM, WITH JOINT OPTIMIZATION ON A DEPTH MAP AND A NORMAL VECTOR MAP

(71) Applicant: Beijing Zitiao Network Technology Co., Ltd., Beijing (CN)

(72) Inventors: Hengkai Guo, Beijing (CN); Wang Zhao, Beijing (CN); Shaohui Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 307 days.

(21) Appl. No.: 18/565,652

(22) PCT Filed: May 23, 2022

(86) PCT No.: PCT/CN2022/094403
§ 371 (c)(1),
(2) Date: Nov. 30, 2023

(87) PCT Pub. No.: WO2023/284412
PCT Pub. Date: Jan. 19, 2023

(65) Prior Publication Data
US 2024/0221198 A1     Jul. 4, 2024

(30) Foreign Application Priority Data
Jul. 12, 2021     (CN) .......................... 202110784134.7

(51) Int. Cl.
*G06T 7/50*          (2017.01)
*G06V 10/44*         (2022.01)

(52) U.S. Cl.
CPC ................ *G06T 7/50* (2017.01); *G06V 10/44* (2022.01); *G06T 2207/20084* (2013.01)

(58) Field of Classification Search
CPC ............. G06T 7/50; G06T 2207/20084; G06T 2207/10028; G06T 2207/20081;
(Continued)

(56) References Cited

U.S. PATENT DOCUMENTS

| | | | |
|---|---|---|---|
| 2018/0232899 A1* | 8/2018 | Lansel ................... | H04N 23/56 |
| 2021/0150747 A1* | 5/2021 | Liu ...................... | G06N 3/0455 |
| 2021/0241527 A1 | 8/2021 | Sun et al. | |

FOREIGN PATENT DOCUMENTS

| | | | |
|---|---|---|---|
| CN | 105046743 A | 11/2015 | |
| CN | 110910437 * | 3/2020 | ............... G06T 7/55 |

(Continued)

OTHER PUBLICATIONS

Xiaojuan et al, ("GeoNet: Geometric Neural Network for Joint Depth and Surface Normal Estimation", 2018 IEEE/CVF Conference on Computer Vision and Pattern Recognition, pp. 283-291) (Year: 2018).*

(Continued)

*Primary Examiner* — Amara Abdi
(74) *Attorney, Agent, or Firm* — Alleman Hall LLP

(57) ABSTRACT

The present disclosure provides an image processing method and apparatus, and an electronic device and a storage medium. The image processing method includes: inputting an initial depth map, a first confidence level of the initial depth map, an initial normal vector map and a second confidence level of the initial normal vector map into an optimizer; performing joint optimization on a depth map and a normal vector map, with an objective of minimizing a difference between an optimized depth map and the depth map before being optimized and a difference between an optimized normal vector map and the normal vector map before being optimized, and an objective of minimizing an error between local planes determined on the basis of a same region in the optimized depth map and the optimized normal (Continued)

Input an initial depth map of a target image, a first confidence level of the initial depth map, an initial normal vector map, and a second confidence level of the initial normal vector map into an optimizer — S110

Perform joint optimization on a depth map and a normal vector map by the optimizer, with an objective of minimizing a difference between an optimized depth map and the depth map before being optimized and a difference between an optimized normal vector map and the normal vector map before being optimized, and an objective of minimizing an error between local planes determined from a same region in the optimized depth map and the optimized normal vector map, wherein the first confidence level and the second confidence level are weights to calculate the difference and the error — S120

Output the optimized depth map and the optimized normal vector map by the optimizer — S130 vector map; and outputting the optimized depth map and the optimized normal vector map.

20 Claims, 5 Drawing Sheets

(58) Field of Classification Search
CPC .. G06T 5/60; G06T 7/62; G06V 10/44; G06N 3/04; G06N 3/084; G06N 3/08
See application file for complete search history.

(56) References Cited

FOREIGN PATENT DOCUMENTS

| | | | | | |
|---|---|---|---|---|---|
| CN | 110910437 A | | 3/2020 | | |
| CN | 111145094 | * | 5/2020 | .......... | G06T 3/4053 |
| CN | 111357034 A | | 6/2020 | | |
| CN | 112418233 A | | 2/2021 | | |
| CN | 112802078 A | | 5/2021 | | |
| CN | 113034670 A | | 6/2021 | | |

OTHER PUBLICATIONS

Mattia et al, ("Joint Graph-based Depth Refinement and Normal Estimation", 2020 IEEE, pp. 12151-12160) (Year: 2020).*
ISA China National Intellectual Property Administration, International Search Report and Written Opinion Issued in Application No. PCT/CN2022/094403, Aug. 2, 2022, WIPO, 16 pages.
Zhao, W. et al., "A Confidence-based Iterative Solver of Depths and Surface Normals for Deep Multi-view Stereo," Proceedings of the 2021 IEEE/CVF International Conference on Computer Vision (ICCV 2021), Jan. 19, 2022, Virtual, 10 pages.
Qi, X. et al., "GeoNet: Geometric Neural Network for Joint Depth and Surface Normal Estimation," Proceedings of the 2018 IEEE/CVF Conference on Computer Vision and Pattern Recognition (CVPR 2018), Jun. 18, 2018, Salt Lake City, UT, 9 pages.
Rossi, M. et al., "Joint Graph-based Depth Refinement and Normal Estimation," Computer Vision and Pattern Recognition (cs.CV), Sep. 2, 2020, 19 pages.
China National Intellectual Property Administration, Office Action and Search Report Issued in Application No. 202110784134.7, Dec. 11, 2025, 23 pages.

* cited by examiner

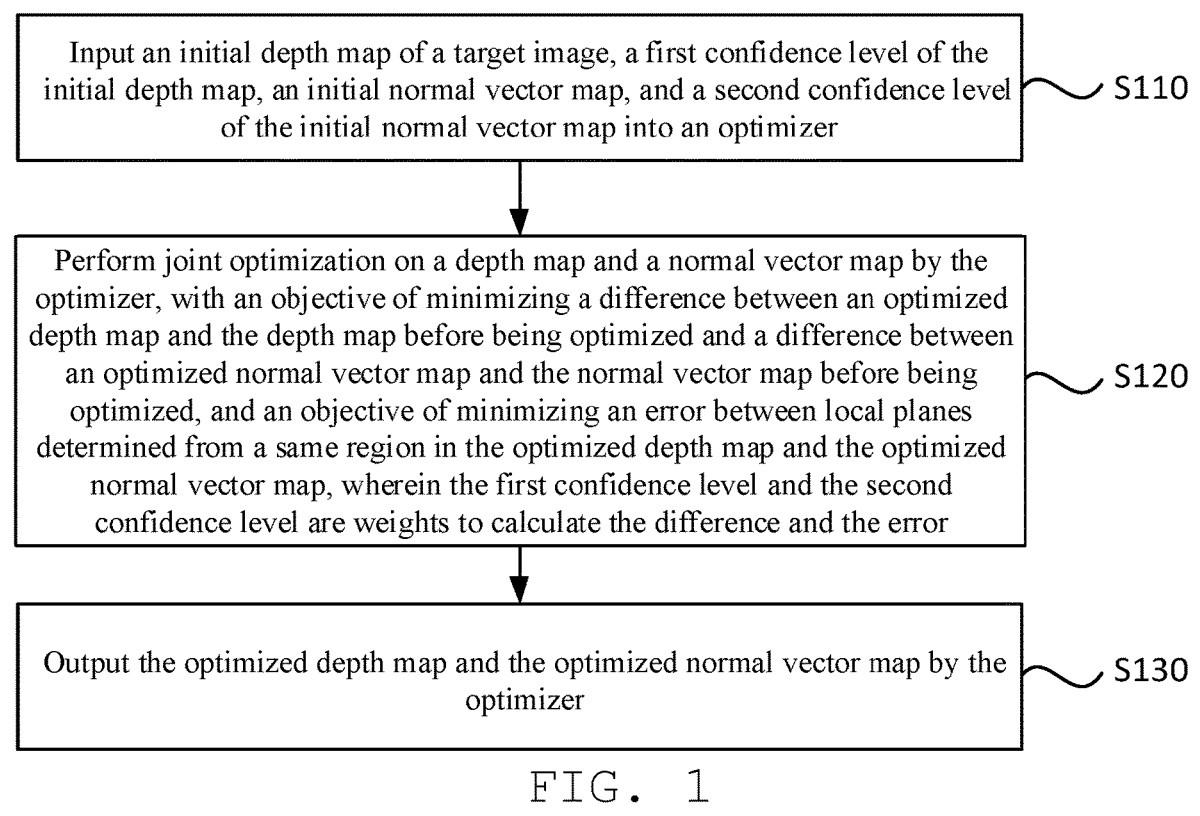

Input an initial depth map of a target image, a first confidence level of the initial depth map, an initial normal vector map, and a second confidence level of the initial normal vector map into an optimizer — S110

Perform joint optimization on a depth map and a normal vector map by the optimizer, with an objective of minimizing a difference between an optimized depth map and the depth map before being optimized and a difference between an optimized normal vector map and the normal vector map before being optimized, and an objective of minimizing an error between local planes determined from a same region in the optimized depth map and the optimized normal vector map, wherein the first confidence level and the second confidence level are weights to calculate the difference and the error — S120

Output the optimized depth map and the optimized normal vector map by the optimizer — S130

FIG. 1

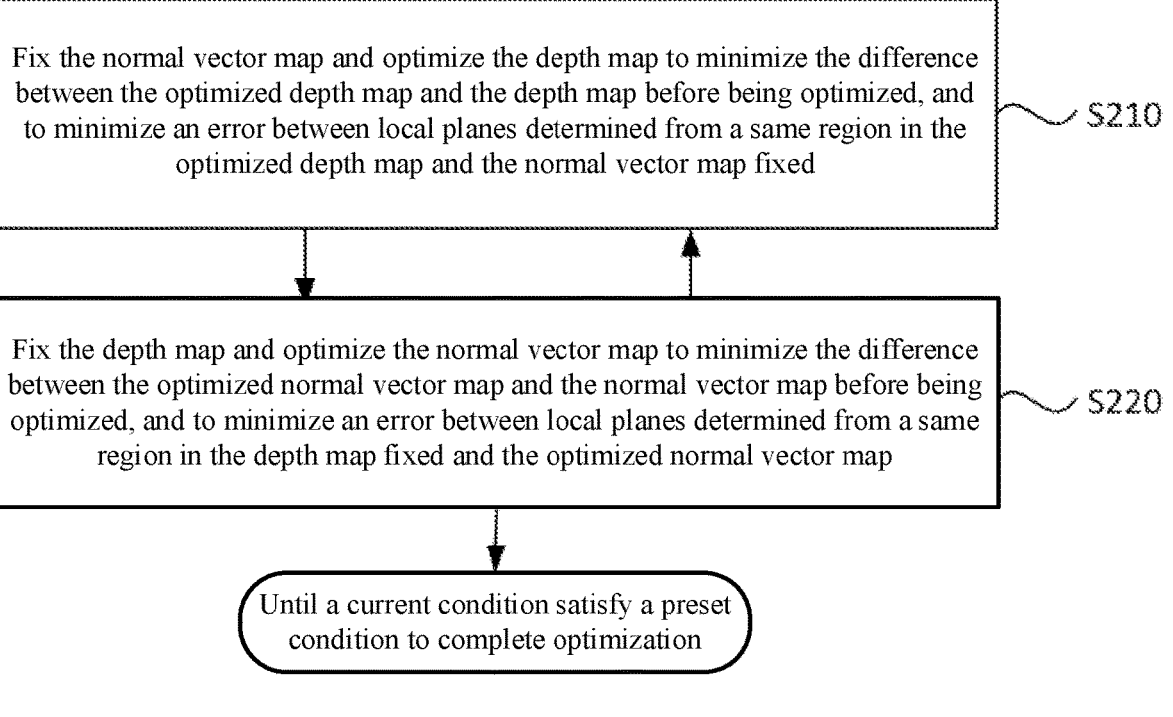

Fix the normal vector map and optimize the depth map to minimize the difference between the optimized depth map and the depth map before being optimized, and to minimize an error between local planes determined from a same region in the optimized depth map and the normal vector map fixed          S210

Fix the depth map and optimize the normal vector map to minimize the difference between the optimized normal vector map and the normal vector map before being optimized, and to minimize an error between local planes determined from a same region in the depth map fixed and the optimized normal vector map          S220

Until a current condition satisfy a preset condition to complete optimization

FIG. 2

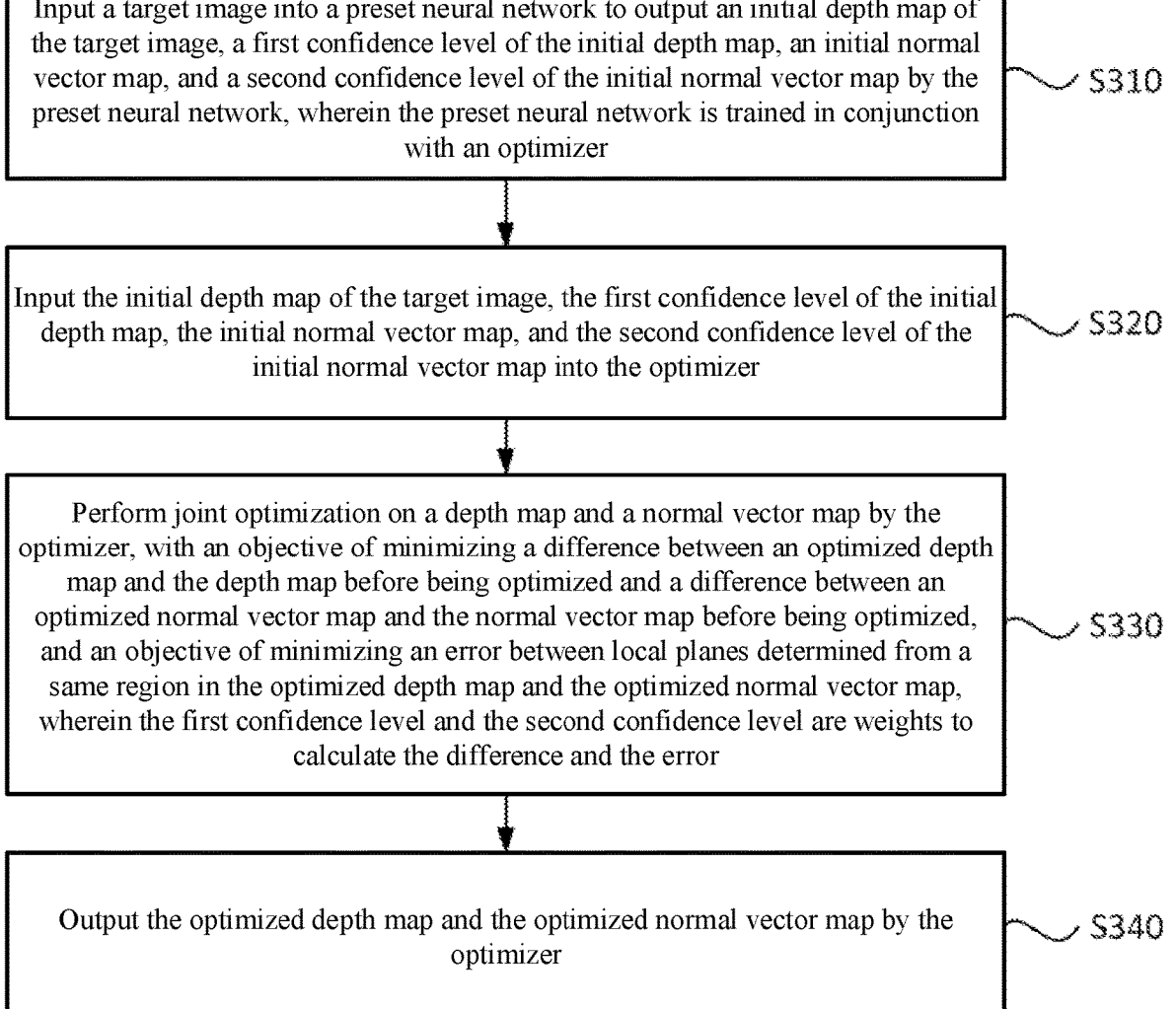

Input a target image into a preset neural network to output an initial depth map of the target image, a first confidence level of the initial depth map, an initial normal vector map, and a second confidence level of the initial normal vector map by the preset neural network, wherein the preset neural network is trained in conjunction with an optimizer                                                                                    S310

Input the initial depth map of the target image, the first confidence level of the initial depth map, the initial normal vector map, and the second confidence level of the initial normal vector map into the optimizer                                                                                    S320

Perform joint optimization on a depth map and a normal vector map by the optimizer, with an objective of minimizing a difference between an optimized depth map and the depth map before being optimized and a difference between an optimized normal vector map and the normal vector map before being optimized, and an objective of minimizing an error between local planes determined from a same region in the optimized depth map and the optimized normal vector map, wherein the first confidence level and the second confidence level are weights to calculate the difference and the error                                                                                    S330

Output the optimized depth map and the optimized normal vector map by the optimizer                                                                                    S340

FIG. 3

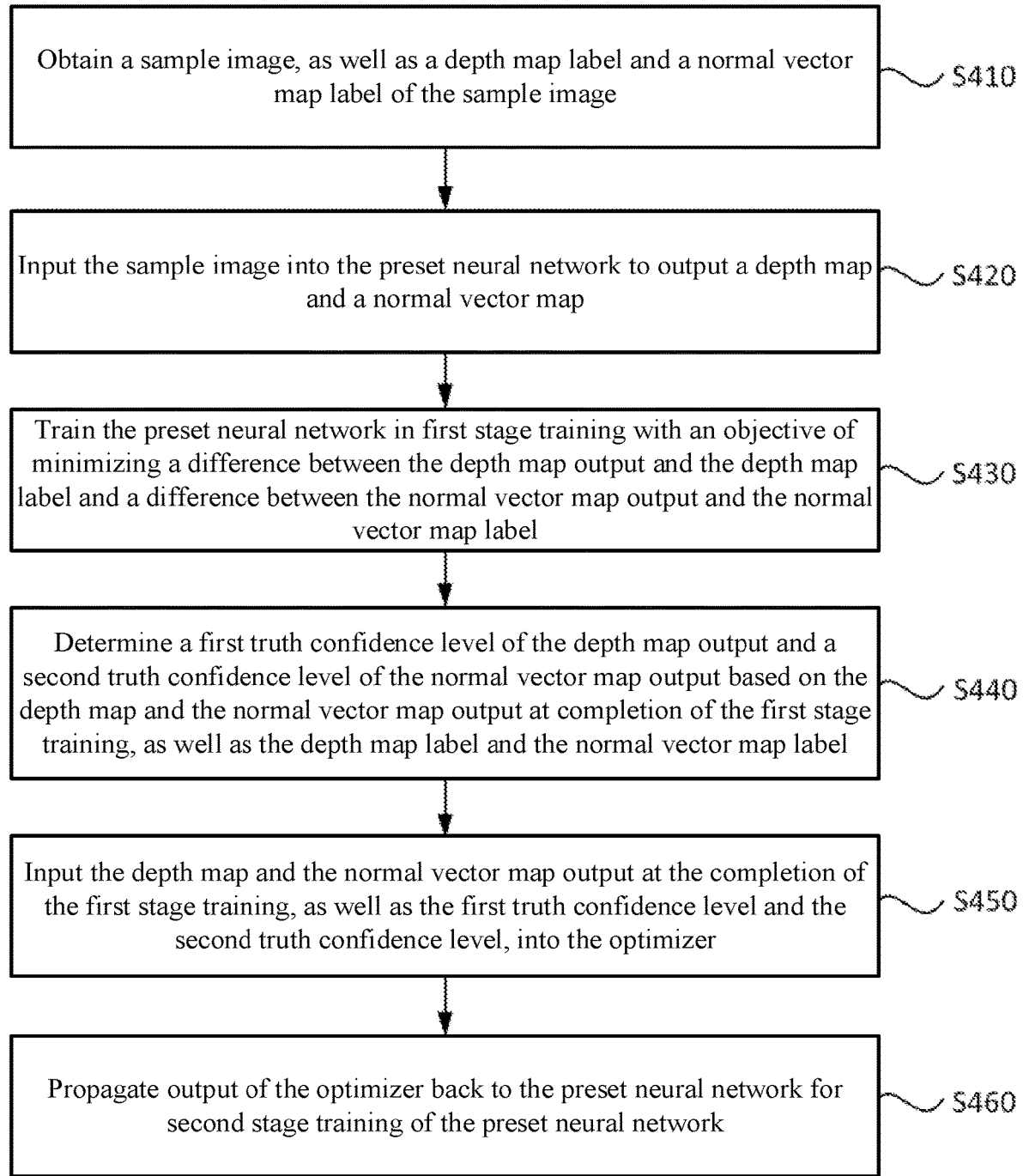

Obtain a sample image, as well as a depth map label and a normal vector map label of the sample image ~ S410

Input the sample image into the preset neural network to output a depth map and a normal vector map ~ S420

Train the preset neural network in first stage training with an objective of minimizing a difference between the depth map output and the depth map label and a difference between the normal vector map output and the normal vector map label ~ S430

Determine a first truth confidence level of the depth map output and a second truth confidence level of the normal vector map output based on the depth map and the normal vector map output at completion of the first stage training, as well as the depth map label and the normal vector map label ~ S440

Input the depth map and the normal vector map output at the completion of the first stage training, as well as the first truth confidence level and the second truth confidence level, into the optimizer ~ S450

Propagate output of the optimizer back to the preset neural network for second stage training of the preset neural network ~ S460

FIG. 4

IMAGE PROCESSING METHOD, AN APPARATUS, AN ELECTRONIC DEVICE, AND A STORAGE MEDIUM, WITH JOINT OPTIMIZATION ON A DEPTH MAP AND A NORMAL VECTOR MAP

CROSS-REFERENCE TO RELATED APPLICATIONS

The present application is a U.S. National Stage Application under 35 U.S.C. § 371 of International Patent Application No. PCT/CN2022/094403, filed on May 23, 2022, which claims priority to China Patent Application No. 202110784134.7, filed on Jul. 12, 2021, the entire content of both of which are incorporated herein by reference.

TECHNICAL FIELD

The present disclosure relates to an image processing method, an apparatus, an electronic device, and a storage medium.

BACKGROUND

In the related art, a depth map and a normal vector map of an image can be regressed using deep learning algorithms, to be applied in fields such as machine vision and three-dimensional reconstruction.

SUMMARY

The present disclosure provides an image processing method, comprising: inputting an initial depth map of a target image, a first confidence level of the initial depth map, an initial normal vector map of the target image, and a second confidence level of the initial normal vector map into an optimizer; performing joint optimization on a depth map and a normal vector map by the optimizer, with an objective of minimizing a difference between an optimized depth map and the depth map before being optimized and a difference between an optimized normal vector map and the normal vector map before being optimized, and an objective of minimizing an error between local planes determined from a same region in the optimized depth map and the optimized normal vector map, wherein the first confidence level and the second confidence level are weights to calculate the difference and the error; and outputting the optimized depth map and the optimized normal vector map by the optimizer.

The present disclosure further provides an image processing apparatus, comprising: an input module configured to input an initial depth map of a target image, a first confidence level of the initial depth map, an initial normal vector map of the target image, and a second confidence level of the initial normal vector map into an optimizer; an optimization module configured to perform joint optimization on a depth map and a normal vector map by the optimizer, with an objective of minimizing a difference between an optimized depth map and the depth map before being optimized and a difference between an optimized normal vector map and the normal vector map before being optimized, and an objective of minimizing an error between local planes determined from a same region in the optimized depth map and the optimized normal vector map, wherein the first confidence level and the second confidence level are weights to calculate the difference and the error; and an output module configured to output the optimized depth map and the optimized normal vector map by the optimizer.

The present disclosure further provides an electronic device, comprising: one or more processors; and a storage device configured to store one or more programs that, when executed by the one or more processors, cause the one or more processors to implement the above image processing method.

The present disclosure further provides a storage medium comprising computer executable instructions that, when executed by a computer processor, perform the above image processing method.

BRIEF DESCRIPTION OF THE DRAWINGS

FIG. 1 is a flowchart of an image processing method provided in an embodiment 1 of the present disclosure;

FIG. 2 is a flowchart illustrating a joint optimization of a depth map and a normal vector map in an image processing method provided in an embodiment 2 of the present disclosure;

FIG. 3 is a flowchart of an image processing method provided in an embodiment 3 of the present disclosure;

FIG. 4 is a flowchart illustrating a process of training a preset neural network in an image processing method provided in an embodiment 3 of the present disclosure;

DETAILED DESCRIPTION

Figure 5:
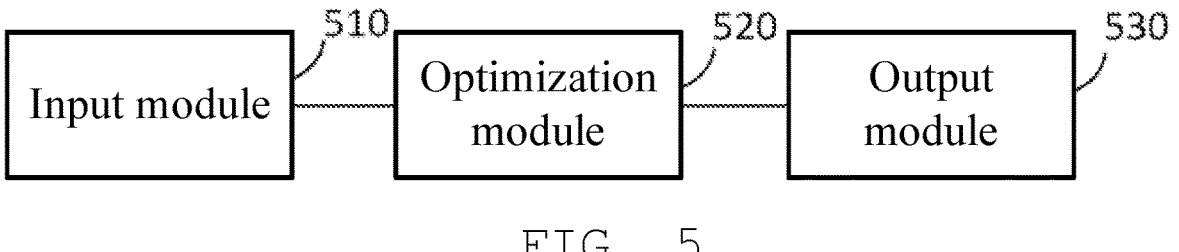
FIG. 5 is a schematic structural diagram of an image processing apparatus provided in an embodiment 4 of the present disclosure.

Below, embodiments of The present disclosure will be described with reference to the drawings. Although some embodiments of the present disclosure are shown in the drawings, the present disclosure can be implemented in various forms, and these embodiments are provided for the purpose of understanding the present disclosure. The accompanying drawings and embodiments of the present disclosure are for illustrative purposes only.

The various steps described in the methods of the embodiments of the present disclosure may be executed in a different order, and/or executed in parallel. In addition, the method embodiments may comprise additional steps and/or some of the illustrated steps may be omitted. The scope of The present disclosure is not limited in this regard.

The term "comprising" and its variants as used herein is an open-ended mode expression, that is, "comprising but not limited to". The term "based on" means "based at least in part on". The term "one embodiment" means "at least one embodiment"; the term "another embodiment" means "at least one additional embodiment"; and the term "some embodiments" means "at least some embodiments". Related definitions of other terms will be given in the following description.

The concepts of "first" and "second" mentioned in the present disclosure are only used to distinguish different devices, modules or units, and are not used to limit the order of functions performed by these devices, modules or units, or interdependence therebetween.

The modifications of "a" and "a plurality of" mentioned in the present disclosure are illustrative and not restrictive, and those skilled in the art should understand that unless clearly indicated in the context, they should be understood as "one or more".

The shortcomings of the related art at least comprise: deep learning algorithms may be affected by an area such as a weak texture or an occlusion during training and use, resulting in poor estimation accuracy of the depth map and the normal vector map.

In view of this, the present disclosure provides an image processing method.

Embodiment 1

FIG. 1 is a flowchart of an image processing method provided in an embodiment 1 of the present disclosure. Embodiments of the present disclosure are applicable to a case of optimizing a depth map and a normal vector map of an image. The method can be performed by an image processing apparatus, which can be implemented in the form of software and/or hardware. The apparatus can be provided in an electronic device, such as a computer.

As shown in FIG. 1, the image processing method provided in the embodiment comprises the following steps.

In S110, an initial depth map of a target image, a first confidence level of the initial depth map, an initial normal vector map, and a second confidence level of the initial normal vector map are input into an optimizer.

In an embodiment of The present disclosure, the target image may comprise a Red-Green-Blue (RGB) image. A depth map can be considered as an image that represents distances from an image collector to each point in a scene using a pixel value. A normal vector map can be considered as a representation of a normal vector perpendicular to a local plane in which each point in a scene is located using a pixel value, and can be understood as a representation of an orientation of the local plane in which the point is located. Both the depth map and the normal vector map are geometric estimation images.

The target image can be iteratively processed based on traditional block matching algorithms to obtain its depth map and normal vector map. Alternatively, the depth map and normal vector map of the target image be regressed by a deep learning algorithm. The depth map and the normal vector map obtained for the target image using any algorithm can be applied to this embodiment, which is not exhaustive herein.

The first confidence level can characterize a degree of confidence in the initial depth map. The second confidence level can characterize a degree of confidence in the initial normal vector map. A range of values for the first confidence level and the second confidence level is usually (0-1). The determination of the first confidence level and the second confidence level is usually related to the determination methods of the depth map and the normal vector map, respectively. Therefore, the first confidence level and the second confidence level can be determined based on the determination methods of the depth map and the normal vector map.

A depth map and a normal vector map generated by a front-end module can be input into the optimizer as the initial depth map and the initial normal vector map of the target image for optimization of the depth map and the normal vector map. In addition, the first confidence level and the second confidence level can also be input into the optimizer to guide the optimizer to optimize a region of low confidence based on a region of high confidence in the depth map and the normal vector map.

In S120, joint optimization is performed on a depth map and a normal vector map by the optimizer, with an objective of minimizing a difference between an optimized depth map and the depth map before being optimized and a difference between an optimized normal vector map and the normal vector map before being optimized, and an objective of minimizing an error between local planes determined from a same region in the optimized depth map and the optimized normal vector map, wherein the first confidence level and the second confidence level are weights to calculate the difference and the error.

In the embodiment of the present disclosure, a local plane assumption is satisfied between the depth map and the normal vector map, which can be explained as follows: based on a depth of a preset small region in the depth map, a local plane can be fitted for the region, and then a normal vector of the local plane can be obtained; a depth of the local plane corresponding to the region can also be inversely derived from the normal vector of the region; within the same region, the plane determined by depth fitting is consistent with the plane determined based on the normal vector. It can be considered that the depth map and the normal vector map can be derived from each other.

The optimizer provided in the embodiment of the present disclosure can perform joint optimization on the depth map and the normal vector map based on the local plane assumption. A joint optimization process can comprise: optimizing an actual normal vector using a normal vector derived from the depth map; and optimizing an actual depth map using a depth derived from the normal vector map. The optimization between the depth map and the normal vector map is an iterative process, and can be done by optimizing the depth map first or the normal vector map first, without any restriction here.

For example, assuming the depth map is denoted by D and the normal vector map is denoted by N, if the initial depth map is D1 and the initial normal vector map is N1, the joint optimization process can be, for example, as follows: optimizing N1 to obtain N2 using a vector derived from D1; optimizing D1 to obtain D2 using a depth derived from N2; optimizing N2 to obtain N3 using a vector derived from D2; . . . ; looping the optimization iteratively until the output of the final D and N. Through the iterative optimization between the depth map and the normal vector map, the accuracy of the depth map and the normal vector map can be improved.

An optimization objective may comprise two objectives, a first objective is to minimize a difference between an optimized depth map and the depth map before being optimized and a difference between an optimized normal vector map and the normal vector map before being optimized, a second objective is to minimize an error between local planes determined based on a same region in the optimized depth map and the optimized normal vector map.

Since the initial depth map and the initial normal vector map have a certain accuracy, by satisfying the first objective in the optimization process, it can avoid a degradation in accuracy caused by over-optimization. Since the depth map and normal vector map have a derivation relationship, the consistency of the optimized depth map and optimized normal vector map can be ensured by satisfying the second objective in the optimization process. The above two objectives are mutually constrained to get an optimal optimization result. If the second objective is removed, the optimization result will be the same as the initial depth map and initial normal vector map. If the first objective is removed, the optimization result may determine multiple scenes to a single plane, resulting in a loss of correlation with the target image.

In the process of joint optimization based on the above optimization objectives, the optimizer can use the first confidence level and the second confidence level as computational weights to calculate a difference that characterizes the degree of achievement of the first objective and an error that characterizes the degree of achievement of the second objective.

By using the first confidence level and the second confidence level to guide the optimizer for optimization, it is possible to make the depth map/normal vector map of the region with high confidence level have a greater impact on the optimization of the depth map/normal vector map. Thus, based on the local plane assumption, it is possible to iteratively propagate the depth and normal vector in the region with high confidence level to neighborhoods with low confidence level through plane propagation to improve the accuracy of the depth and the normal vector in the region with the low confidence level. It can effectively compensate for the shortcomings of poor estimation accuracy of depths and normal vectors in the region such as the weak texture or the occlusion in relevant method, greatly reducing the prediction burden of the front-end module.

In S130, the optimized depth map and the optimized normal vector map are outputted by the optimizer.

In the embodiment of the present disclosure, the optimized depth map and the optimized normal vector map have higher accuracy, which is beneficial for subsequent high accuracy three-dimensional reconstruction and machine vision processing. In the embodiment of the present disclosure, the depth map and the normal vector map of the target image can be considered as geometric estimation results of the target image. Other geometric estimation results applicable to the optimization process provided in the embodiment of the present disclosure can also be applied here, which will not be exhaustively listed here.

In some optional implementations, the performing of the joint optimization on the depth map and the normal vector map comprises: extracting sample points from the same region in the optimized depth map and the optimized normal vector map; and fitting the local planes based on the sample points extracted from the optimized depth map and the optimized normal vector map.

When calculating an error used to characterize the second objective, if the plane is fit based on all points in the region, it can easily lead to excessive computation and increased computation time, thereby affecting optimization efficiency to a certain extent.

In these optional implementations, sample points can be extracted from the same region of depth map and the normal vector map according to the same rule. These extracted sample points can represent the features of a generalized neighborhood. By using the extracted sample points to perform plane fitting, the computation of plane fitting can be reduced, thereby improving optimization efficiency. Accordingly, the depth and normal vector of a region with high confidence can be iteratively propagated to the generalized neighborhood by planar propagation.

In the technical solution of the embodiment of the present disclosure, an initial depth map of a target image, a first confidence level of the initial depth map, an initial normal vector map, and a second confidence level of the initial normal vector map are input into an optimizer; joint optimization is performed on a depth map and a normal vector map by the optimizer, with an objective of minimizing a difference between an optimized depth map and the depth map before being optimized and a difference between an optimized normal vector map and the normal vector map before being optimized, and an objective of minimizing an error between local planes determined from a same region in the optimized depth map and the optimized normal vector map, wherein the first confidence level and the second confidence level are weights to calculate the difference and the error; and the optimized depth map and the optimized normal vector map are output by the optimizer.

In the joint optimization process of the depth map and the normal vector map using the optimizer, by minimizing the difference between the optimized depth map and the depth map before being optimized and the difference between the optimized normal vector map and the normal vector map before being optimized, the distortion caused by the optimizer over-optimizing the initial depth map and the initial normal vector map can be avoided. In addition, during the optimization process, by minimizing the error between local planes determined from the same region in the optimized depth map and the optimized normal vector map, it is possible to achieve the optimization of the depth map and the normal vector map to each other through plane propagation based on an assumption that the local planes are the same, thereby improving the accuracy of the depth map and the normal vector map. In addition, by calculating the difference and the error based on the first confidence level and the second confidence level, it is possible to guide the optimization process of the depth map and the normal vector map in terms of confidence. Based on the depth and the normal vector at a high confidence position in the depth map/normal vector map, the depth and normal vector at a low confidence position can be optimized, thereby improving the estimation accuracy of the depth and normal vector in the region such as the weak texture or the occlusion. In this way, the accuracy of the depth map and the normal vector map can be improved, which can greatly reduce the burden on the front-end module to determine the initial depth map and the initial normal vector map.

Embodiment 2

Embodiments of the present disclosure can be combined with the optional solution of the image processing method provided in the above embodiment. A joint optimization process of the depth map and the normal vector map in the image processing method provided by the present embodiment will be described. By performing the two steps of optimizing the depth map with a fixed normal vector map and optimizing the normal vector map with a fixed depth map in a loop, it is possible to obtain a closed-form solution to the optimization objectives to iteratively optimize the depth map and the normal vector map in a stepwise manner.

FIG. 2 is a flowchart illustrating a joint optimization of a depth map and a normal vector map in an image processing method provided in an embodiment 2 of the present disclosure. As shown in FIG. 2, in the image processing method provided by the embodiment, the performing of the joint optimization on the depth map and the normal vector map comprises: performing a following operation in a loop to iteratively optimize the depth map and the normal vector map until a current condition satisfy a preset condition to complete optimization.

In S210, the normal vector map is fixed and the depth map is optimized to minimize the difference between the optimized depth map and the depth map before being optimized, and to minimize an error between local planes determined from a same region in the optimized depth map and the normal vector map fixed.

In S220, the depth map is fixed and the normal vector map is optimized to minimize the difference between the optimized normal vector map and the normal vector map before being optimized, and to minimize an error between local planes determined from a same region in the depth map fixed and the optimized normal vector map.

In this embodiment, an energy function can be defined in advance, wherein the energy function can comprise two terms: a data term and a regularization term. The energy function can be positively correlated with the data term and the regularization term. The data term can represent the difference between an optimized depth map and the depth map before being optimized and the difference between the optimized normal vector map and the normal vector map before being optimized, the regularization term can represent the error between local planes determined from the same region in the optimized depth map and the optimized normal vector map. The energy function can be minimized when the combination of the data term and the regularization term reaches its minimum value, thereby achieving the optimization objectives.

Since there is no closed-form solution for the combination of the two terms, in the joint optimization process provided in the embodiment of the present disclosure, the optimizer may perform two iterative optimization steps in loops to obtain a closed-form solution for the energy function. The above S210 and S220 can be regarded as steps for iteratively optimizing the depth map and the normal vector map respectively in loops, both of which have closed-form solutions and can be iterated multiple times.

There is no strict timing relationship between S210 and S220. The normal vector map can be fixed first to optimize the depth map, and then the depth map can be fixed to optimize the normal vector map; or the depth map can be fixed first to optimize the normal vector map, and then the normal vector map can be fixed to optimize the depth map.

In some optional implementations, the current condition satisfying the preset condition comprises: a current number of loops reaching a preset number; and/or the difference and the error determined in a current loop satisfying a preset threshold.

Both the depth map and the normal vector map can be optimized once, as a single loop optimization. The difference and the error can be calculated once after each loop is completed. The preset number and the preset threshold can be preset based on empirical and experimental values.

Since the performance of the optimizer may not change significantly or may deteriorate after a certain number of times of optimization, in these optional implementations, by setting a preset number and/or a preset threshold, it is possible to output the optimization result of the depth map and the normal vector map when they have been optimized to a certain extent, so that the optimization process can be avoided from being too time-consuming and deteriorating in effect.

The technical solution of the embodiment of the present disclosure describes a joint optimization process of the depth map and the normal vector map. By performing the two steps of optimizing the depth map with a fixed normal vector map and optimizing the normal vector map with a fixed depth map in a loop, it is possible to obtain a closed-form solution to the optimization objectives to iteratively optimizing the depth map and the normal vector map in a stepwise manner. In addition, the image processing method provided by the embodiment of the present disclosure and the image processing method provided by the above embodiment belong to the same disclosed concept. For the technical details not described in detail in this embodiment, reference can be made to the above embodiment, and the same technical feature has the same beneficial effect in the present embodiment and the embodiment described above.

Embodiment 3

Embodiments of the present disclosure can be combined with the optional solution of the image processing method provided in the above embodiment. In the image processing method provided in the embodiment, the step of determining the initial depth image, the initial normal vector map, the first confidence level and the second confidence level in the image processing method of the present disclosure, and a step of training a preset neural network will be described. The initial depth map, the initial normal vector map and the first confidence level and the second confidence level can be outputted at the same time by the preset neural network. Moreover, during the training process of the preset neural network, the preset neural network is trained in conjunction with an optimizer, which enables the preset neural network to estimate the depth and the normal vector in the region such as the weak texture or the occlusion more accurately.

FIG. 3 is a flowchart of an image processing method provided in an embodiment 3 of the present disclosure. As shown in FIG. 3, the image processing method provided in this embodiment comprises the following steps.

In S310, a target image is inputted into a preset neural network to output an initial depth map of the target image, a first confidence level of the initial depth map, an initial normal vector map, and a second confidence level of the initial normal vector map by the preset neural network, wherein the preset neural network is trained in conjunction with an optimizer.

In this embodiment, the preset neural network can be a network capable of outputting a depth map and a normal vector map of a target image, as well as their confidence levels. The preset neural network can be a modified network based on Multi-view Stereo Net (MVS Net), or be a network based on another network, wherein the other network can be, for example, Learning Stereo Machine (LSM), etc., which will not be exhaustively listed here.

For example, when the preset neural network is based on the MVS network, a plurality of frames of images under different visions can be input, and a matching cost can be constructed in the feature space using planar scanning. Moreover, based on the matching cost, a prediction of the depth map and the normal vector map of the target image in the plurality of frames of images input can be obtained using a plurality of three-dimensional convolution and two-dimensional convolution modules.

It is also possible to predict the first confidence level and the second confidence level based on a feature extracted from an intermediate layer of the preset neural network. For example, a feature map output from the intermediate layer of the preset neural network is input into a micro network containing an expansion convolution and a sigmoid activation function to regress the first confidence level and the second confidence level.

The preset neural network can be trained in conjunction with the optimizer during the training stage. For example, during the training process of the preset neural network, an optimizer can be connected to the output of the preset neural network, and the optimization result of the optimizer can be fed back to the front-end preset neural network to enable the preset neural network to learn how the optimizer optimizes the depth and the normal vector in the region such as the weak texture or the occlusion, etc. Thus, the depth map and the normal vector map output by the trained preset neural network can achieve higher accuracy.

In S320, the initial depth map of the target image, the first confidence level of the initial depth map, the initial normal vector map, and the second confidence level of the initial normal vector map are input into the optimizer.

In practice, when using a preset neural network to perform the image processing method, the optimizer can also be connected to the output of the preset neural network, to enable the optimizer to optimize the depth map and the normal vector map output by the network based on the first confidence level and the second confidence level output by the prediction neural network.

In S330, joint optimization is performed on a depth map and a normal vector map by the optimizer, with an objective of minimizing a difference between an optimized depth map and the depth map before being optimized and a difference between an optimized normal vector map and the normal vector map before being optimized, and an objective of minimizing an error between local planes determined from a same region in the optimized depth map and the optimized normal vector map, wherein the first confidence level and the second confidence level are weights to calculate the difference and the error.

In S340, the optimized depth map and the optimized normal vector map are output by the optimizer.

In some optional implementations, the training process of the preset neural network can comprise two stages. First stage training can comprise a step of separately training the preset neural network; second stage training can comprise a step of jointly training the preset neural network according to the optimizer. As an example, FIG. 4 is a flowchart illustrating a process of training a preset neural network in an image processing method provided in an embodiment 3 of the present disclosure.

As shown in FIG. 4, in some optional implementations, the preset neural network is trained based on the following steps.

In S410, a sample image, as well as a depth map label and a normal vector map label of the sample image, are obtained.

In S420, the sample image is input into the preset neural network to output a depth map and a normal vector map.

In S430, the preset neural network is trained in first stage training with an objective of minimizing a difference between the depth map output and the depth map label and a difference between the normal vector map output and the normal vector map label.

The first stage training can comprise steps S410-S430, in which the preset neural network separately is trained using the depth map label and the normal vector map label of the sample image.

In the first stage training, a truth value of the confidence level of the output depth map and the truth value of the confidence level of the output normal vector map can also be determined based on the currently trained preset neural network, the output depth map and the output normal vector map, as well as the depth map label and the normal vector map label. Moreover, the preset neural network can be trained based on the truth value of the confidence level of the determined depth map/normal vector map and the confidence level of the depth map/normal vector map output by the preset neural network.

In S440, a first truth confidence level of the depth map output and a second truth confidence level of the normal vector map output are determined based on the depth map and the normal vector map output at completion of the first stage training, as well as the depth map label and the normal vector map label.

The first truth confidence level can represent a depth error between the depth map output in the first training stage and the depth map label; the second truth confidence level can represent an angle error between the normal vector map output in the first training stage and the normal vector map label. The method for determining the first truth confidence level/second truth confidence level can comprise, for example, determining a difference between the depth map/normal vector map output at the completion of the first stage training and the depth map label/normal vector map label; normalizing a ratio of the difference to the depth map label/normal vector map label to 0-1 to obtain the first truth confidence level/second truth confidence level. Another method that can represent the depth error and the angle error can also be applied to the calculation of the first truth confidence level and the second truth confidence level, which will not be exhaustively listed here.

In S450, the depth map and the normal vector map output at the completion of the first stage training, as well as the first truth confidence level and the second truth confidence level, are input into the optimizer.

By inputting the first truth confidence level and the second truth confidence level into the optimizer for training, the training of the preset neural network can be more stable.

In S460, output of the optimizer is propagated back to the preset neural network for second stage training of the preset neural network.

The second stage training can comprise steps S440 to S460, in which the preset neural network is jointly trained based on the output of the optimizer. When the preset neural network trained in conjunction with the optimizer converges, it can be considered that the training of the preset neural network is complete.

In the second stage training, an iterative optimizer is connected to the preset neural network for joint training, and a loss function can be applied before and after the optimizer for backpropagation, so that the preset neural network can learn the differences of the depth map and the normal vector map before and after optimization.

In these optional implementations, by training the preset neural network in the first stage training, it is possible to ensure that the preset neural network can has a certain prediction accuracy for the depth and the normal vector; by training the preset neural network in the second stage training, it is possible to enable the preset neural network to predict the depth and the normal vector with a slightly higher accuracy in the region where it is difficult to establish a matching relationship, such as the weak texture or the occlusion, thereby improving the predictive accuracy of the neural network to s certain extent.

In some optional implementations, the first confidence level is determined based on a depth re-projection error between the target image and an auxiliary image having a view angle difference from the target image.

The front-end module (such as the preset neural network) can obtain images of the same feature point captured at different positions (i.e. the target image and the auxiliary images). Different frames of images comprise the depths of the same feature point. Theoretically, projection between frames will result in the same depth of the feature point. The depth re-projection error can be used to characterize a degree of difference in the depth of the feature point after projection through frame to frame.

The first confidence level can be determined jointly with the depth re-projection error on the basis of the confidence level of the depth map output by the front-end module, for example, by a weighting process thereof. The first confidence level can be inversely correlated with the re-projection error, that is, the greater the depth difference between multiple feature points determined using the target image and the auxiliary image, the lower the first confidence level.

In these optional implementations, by combining the confidence level of the depth map output by the front-end module with the additionally determined re-projection error, the accuracy of the first confidence level can be improved, which is conducive to guiding the optimizer to optimize the depth map and the normal vector map, so that the accuracy of the optimization result can be improved.

In the technical solution of the embodiments of the present disclosure, the step of determining the initial depth image, the initial normal vector map, the first confidence level and the second confidence level and a step of training the preset neural network are described. By means of the preset neural network, the initial depth map, the initial normal vector map and the first confidence level and the second confidence level can be output at one time. Moreover, during the training process of the preset neural network, the preset neural network is trained in conjunction with an optimizer, which can make the estimation of the depth and the normal vector in the region such as the weak texture or the occlusion more accurate. The image processing method provided by the embodiment of the present disclosure and the image processing method provided by the above embodiment belong to the same concept. For the technical details not described in detail in this embodiment, reference can be made to the above embodiment, and this embodiment can achieve the same beneficial effect as the above embodiment.

Embodiment 4

FIG. 5 is a schematic structural diagram of an image processing apparatus provided in an embodiment 4 of the present disclosure. The image processing apparatus provided in this embodiment is applicable to the case of optimizing a depth map and a normal vector map of an image.

As shown in FIG. 5, the image processing apparatus provided in this embodiment comprises: an input module 510 configured to input an initial depth map of a target image, a first confidence level of the initial depth map, an initial normal vector map, and a second confidence level of the initial normal vector map into an optimizer; an optimization module 520 configured to perform joint optimization on a depth map and a normal vector map by the optimizer, with an objective of minimizing a difference between an optimized depth map and the depth map before being optimized and a difference between an optimized normal vector map and the normal vector map before being optimized, and an objective of minimizing an error between local planes determined from a same region in the optimized depth map and the optimized normal vector map, wherein the first confidence level and the second confidence level are weights to calculate the difference and the error; and an output module 530 configured to output the optimized depth map and the optimized normal vector map by the optimizer.

In some optional implementations, the optimization module 520 is configured to: perform a following operation in a loop to iteratively optimize the depth map and the normal vector map until a current condition satisfy a preset condition to complete optimization: fixing the normal vector map and optimizing the depth map to minimize the difference between the optimized depth map and the depth map before being optimized, and to minimize an error between local planes determined from a same region in the optimized depth map and the normal vector map fixed; and fixing the depth map and optimizing the normal vector map to minimize the difference between the optimized normal vector map and the normal vector map before being optimized, and to minimize an error between local planes determined from a same region in the depth map fixed and the optimized normal vector map.

In some optional implementations, the current condition satisfying the preset condition comprises: a current number of loops reaching a preset number; and/or the difference and the error determined in a current loop satisfying a preset threshold.

In some optional implementations, the optimization module 520 is further configured to: extract sample points from the same region in the optimized depth map and the optimized normal vector map; and fit the local planes based on the sample points extracted from the optimized depth map and the optimized normal vector map.

In some optional implementations, the image processing apparatus further comprises: an input data determination module configured to input the target image into a preset neural network to output the initial depth map of the target image, the first confidence level of the initial depth map, the initial normal vector map, and the second confidence level of the initial normal vector map by the preset neural network, wherein the preset neural network is trained in conjunction with the optimizer.

In some optional implementations, the first confidence level and the second confidence level are predicted based on a feature extracted from an intermediate layer of the preset neural network.

In some optional implementations, the image processing apparatus further comprises: a network training module configured to train the preset neural network based on the following steps: obtaining a sample image, as well as a depth map label and a normal vector map label of the sample image; inputting the sample image into the preset neural network to output a depth map and a normal vector map; training the preset neural network in first stage training with an objective of minimizing a difference between the depth map output and the depth map label and a difference between the normal vector map output and the normal vector map label; determining a first truth confidence level of the depth map output and a second truth confidence level of the normal vector map output based on the depth map and the normal vector map output at completion of the first stage training, as well as the depth map label and the normal vector map label; inputting the depth map and the normal vector map output at the completion of the first stage training, as well as the first truth confidence level and the second truth confidence level, into the optimizer; and propagating output of the optimizer back to the preset neural network for second stage training of the preset neural network.

In some optional implementations, the first confidence level is determined based on a depth re-projection error between the target image and an auxiliary image having a view angle difference from the target image.

The image processing apparatus provided in the embodiment of the present disclosure can perform the image processing method provided in any embodiment of the present disclosure, and has function modules and effects corresponding to the execution of the method.

The plurality of units and modules comprised in the above apparatus are only divided according to the functional logic, but are not limited to the above division, as long as the corresponding functions can be realized. In addition, the names of the functional units are only for the convenience of distinguishing from each other, and are not used to limit the protection scope of the embodiments of the present disclosure.

Embodiment 5

Figure 6:
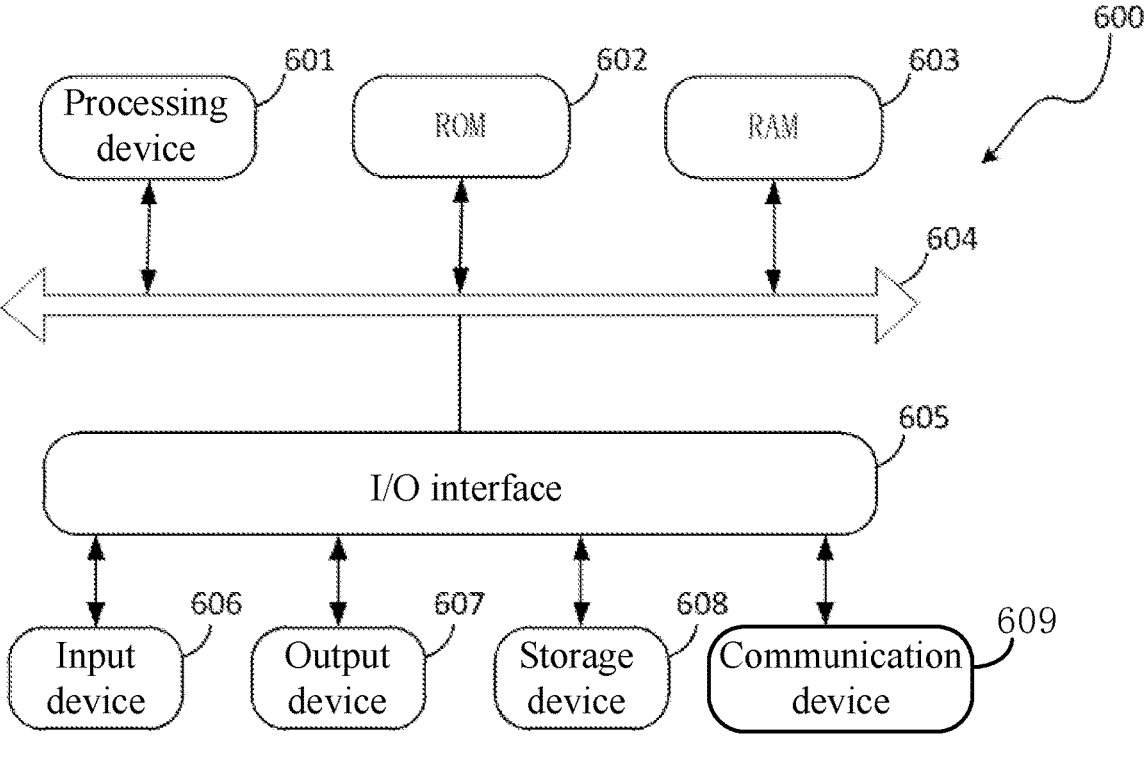
FIG. 6 is a schematic structural diagram of an electronic device provided in an embodiment 5 of the present disclosure.

Referring to FIG. 6, a structural diagram of an electronic device (e.g., a terminal device or server shown in FIG. 6) 600 suitable for implementing an embodiment of the present disclosure is shown. The terminal device 600 of the embodiment of the present disclosure may comprise, but not limited to, a mobile terminal such as a mobile phone, a notebook computer, a digital broadcast receiver, a PDA (Personal Digital Assistant), a PAD (tablet computer), a PMP (Portable Media Player), an on-board terminal (such as an on-board navigation terminal), and a fixed terminal such as a digital television (TV), a desktop computer, and the like. The electronic device 600 shown in FIG. 6 is merely an example and should not impose any limitation on the function and scope of the embodiments of the present disclosure.

As shown in FIG. 6, the electronic device 600 may comprise a processing device (e.g., a central processing unit, a graphics processor) 601, which may perform various appropriate actions and processes according to a program stored in Read Only Memory (ROM) 602 or a program loaded from a storage device 608 into Random Access Memory (RAM) 603. In RAM 603, various programs and data required for the operation of the electronic device 600 are also stored. Processing device 601, ROM 602 and RAM 603 are connected to each other through bus 604. Input/Output (I/O) interface 605 is also connected to bus 604.

Generally, the following devices can be connected to I/O interface 605: an input device 606 comprising, for example, a touch screen, a touch pad, a keyboard, a mouse, a camera, a microphone, an accelerometer, a gyroscope, etc; an output device 607 comprising a liquid crystal display (LCD), a speaker, a vibrator, etc.; a storage device 608 comprising, for example, a magnetic tape, a hard disk, etc; and a communication device 609. The communication device 609 enables the electronic device 600 to communicate in a wireless or wired manner with other devices to exchange data. Although FIG. 6 shows the electronic device 600 with various components, it is not required to implement or have all of these components shown. Alternatively, more or fewer components can be implemented or provided.

According to an embodiment of the present disclosure, the processes described above with reference to the flowchart can be implemented as a computer software program. For example, an embodiment of the present disclosure comprises a computer program product, which comprises a computer program carried on a non-transitory computer readable medium, and containing program code for executing the method shown in the flowchart. In such an embodiment, the computer program may be downloaded and installed from the network through the communication device 609, or installed from the storage device 608, or from the ROM 602. When the computer program is executed by the processing device 601, the above functions defined in the image display method of the embodiment of the present disclosure are performed.

The electronic device provided by the embodiment of the present disclosure and the image processing method provided by the above embodiment belong to the same disclosure concept. For the technical details not described in detail in this embodiment, reference can be made to the above embodiment, and this embodiment can achieve the same beneficial effect as the above embodiment.

Embodiment 6

An embodiment of the present application provides a computer storage medium stored thereon a computer program that, when executed by a processor, implements the image processing method provided in the above embodiment.

The computer readable medium in the present disclosure may be a computer readable signal medium or a computer readable storage medium, or any combination of thereof. The computer readable storage medium can be, for example, but not limited to, an electronic, magnetic, optical, electromagnetic, infrared, or semiconductor system, apparatus, or device, or any combination of the above. More specific examples of the computer readable storage medium may comprise, but are not limited to: electrical connection with one or more wires, portable computer disk, hard disk, RAM, ROM, erasable programmable read-only memory (EPROM) or flash memory (FLASH), fiber optics, portable compact disk Read only memory (Compact Disc Read-Only Memory, CD-ROM), optical storage device, magnetic storage device, or any suitable combination of the foregoing. In the present disclosure, the computer readable storage medium can be any tangible medium that can contain or store a program, which can be used by or in connection with an instruction execution apparatus or device. In the present disclosure, a computer readable signal medium may comprise a data signal that is propagated in the baseband or as part of a carrier, carrying computer readable program code. Such propagated data signals can take a variety of forms comprising, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution apparatus, or device. Program code embodied on a computer readable medium can be transmitted by any suitable medium, comprising but not limited to wires, optical cables, RF (Radio Frequency), etc., or any suitable combination of the above.

In some embodiments, a client and a server can communicate using any currently known or future developed network protocol such as HTTP (HyperText Transfer Protocol), and can be interconnected by any form or medium of digital data communication, e.g., a communication network. Examples of communication networks comprise a Local Area Network (LAN), a Wide Area Network (WAN), an Internet (e.g., the Internet), and an end-to-end network (e. g., an ad hoc end-to-end network), as well as any currently known or future developed network.

The above computer readable medium may be comprised in the electronic device described above; or it may exist alone without being assembled into the electronic device.

The computer readable medium carries one or more programs that, when executed by the electronic device, cause the electronic device to: input an initial depth map of a target image, a first confidence level of the initial depth map, an initial normal vector map, and a second confidence level of the initial normal vector map into an optimizer; perform joint optimization on a depth map and a normal vector map by the optimizer, with an objective of minimizing a difference between an optimized depth map and the depth map before being optimized and a difference between an optimized normal vector map and the normal vector map before being optimized, and an objective of minimizing an error between local planes determined from a same region in the optimized depth map and the optimized normal vector map, wherein the first confidence level and the second confidence level are weights to calculate the difference and the error; and output the optimized depth map and the optimized normal vector map by the optimizer.

The computer program code for executing operations of the present disclosure may be written in one or more program design languages or combinations thereof, wherein the program design languages comprises, but are not limited to, object-oriented program design languages, such as Java, Smalltalk, C++, etc, as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the case involving the remote computer, the remote computer may be connected to the user computer through various kinds of networks, comprising LAN or WAN, or connected to external computer (for example using an internet service provider via Internet).

The flowcharts and block diagrams in the accompanying drawings illustrate the architecture, functionality, and operation of some possible implementations of methods and computer program products in accordance with various embodiments of the present disclosure. In this regard, each block in the flowchart or block diagrams may represent a module, segment, or portion of code, which comprises one or more executable instructions for implementing the specified logical functions. It should also be noted that, in some alternative implementations, the functions noted in the block may occur out of the order noted in the accompanying drawings. For example, two blocks shown in succession may be executed substantially in parallel, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or operations, or combinations of special purpose hardware and computer instructions.

The units involved in the embodiments described in the present disclosure can be implemented in software or hardware. The names of the units or modules do not constitute a limitation on the units or modules themselves under certain circumstances.

The functions described above may be performed at least in part by one or more hardware logic components. For example, without limitation, exemplary types of hardware logic components that can be used comprise: Field Programmable Gate Array (FPGA), Application Specific Integrated Circuit (ASIC), Application Specific Standard Product (ASSP), System on Chip (SOC), Complex Programmable Logic Device (CPLD), or the like.

In the context of the present disclosure, a machine-readable medium may be a tangible medium, which may contain or store a program for use by or in connection with an instruction execution apparatus, or device. The machine-readable medium may be a machine-readable signal medium or a machine-readable storage medium. The machine readable medium may comprise, but is not limited to, an electronic, magnetic, optical, electromagnetic, infrared, or semiconductor apparatus, or device, or any suitable combination of thereof. More specific examples of the machine-readable storage medium may comprise electrical connection with one or more wires, portable computer disk, hard disk, RAM, ROM, EPROM or flash, fiber optics, CD-ROM, optical storage device, magnetic storage device, or any suitable combination of the foregoing.

According to one or more embodiments of the present disclosure, [Example 1] provides an image processing method, comprising: inputting an initial depth map of a target image, a first confidence level of the initial depth map, an initial normal vector map of the target image, and a second confidence level of the initial normal vector map into an optimizer; performing joint optimization on a depth map and a normal vector map by the optimizer, with an objective of minimizing a difference between an optimized depth map and the depth map before being optimized and a difference between an optimized normal vector map and the normal vector map before being optimized, and an objective of minimizing an error between local planes determined from a same region in the optimized depth map and the optimized normal vector map, wherein the first confidence level and the second confidence level are weights to calculate the difference and the error; and outputting the optimized depth map and the optimized normal vector map by the optimizer.

According to one or more embodiments of the present disclosure, [Example 2] provides an image processing method, further comprising: in some optional implementations, the performing of the joint optimization on the depth map and the normal vector map comprising: performing a following operation in a loop to iteratively optimize the depth map and the normal vector map until a current condition satisfy a preset condition to complete optimization: fixing the normal vector map and optimizing the depth map to minimize the difference between the optimized depth map and the depth map before being optimized, and to minimize an error between local planes determined from a same region in the optimized depth map and the normal vector map fixed; and fixing the depth map and optimizing the normal vector map to minimize the difference between the optimized normal vector map and the normal vector map before being optimized, and to minimize an error between local planes determined from a same region in the depth map fixed and the optimized normal vector map.

According to one or more embodiments of the present disclosure, [Example 3] provides an image processing method, further comprising: in some optional implementations, the current condition satisfying the preset condition comprising: a current number of loops reaching a preset number; and/or the difference and the error determined in a current loop satisfying a preset threshold.

According to one or more embodiments of the present disclosure, [Example 4] provides an image processing method, further comprising: in some optional implementations, the performing of the joint optimization on the depth map and the normal vector map comprising: extracting sample points from the same region in the optimized depth map and the optimized normal vector map; and fitting the local planes based on the sample points extracted from the optimized depth map and the optimized normal vector map.

According to one or more embodiments of the present disclosure, [Example 5] provides an image processing method, further comprising: in some implementations, inputting the target image into a preset neural network to output the initial depth map, the first confidence level of the initial depth map, the initial normal vector map, and the second confidence level of the initial normal vector map by the preset neural network, wherein the preset neural network is trained in conjunction with the optimizer.

According to one or more embodiments of the present disclosure, [Example 6] provides an image processing method, further comprising: in some optional implementations, the first confidence level and the second confidence level being obtained by making a prediction based on a feature extracted from an intermediate layer of the preset neural network.

According to one or more embodiments of the present disclosure, [Example 7] provides an image processing method, further comprising: in some optional implementations, a process of training the preset neural network comprising: obtaining a sample image, as well as a depth map label and a normal vector map label of the sample image; inputting the sample image into the preset neural network to output a depth map and a normal vector map; training the preset neural network in first stage training with an objective of minimizing a difference between the depth map output and the depth map label and a difference between the normal vector map output and the normal vector map label; determining a first truth confidence level of the depth map output and a second truth confidence level of the normal vector map output based on the depth map and the normal vector map output at completion of the first stage training, as well as the depth map label and the normal vector map label; inputting the depth map and the normal vector map output at the completion of the first stage training, as well as the first truth confidence level and the second truth confidence level, into the optimizer; and propagating output of the optimizer back to the preset neural network for second stage training of the preset neural network.

According to one or more embodiments of the present disclosure, [Example 8] provides an image processing method, further comprising: in some optional implementations, the first confidence level being determined based on a depth re-projection error between the target image and an auxiliary image having a view angle difference from the target image.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are comprised in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable subcombination.

What is claimed is:

1. An image processing method, comprising:
  inputting an initial depth map of a target image, a first confidence level of the initial depth map, an initial normal vector map of the target image, and a second confidence level of the initial normal vector map into an optimizer;
  performing joint optimization on a depth map and a normal vector map by the optimizer, with an objective of minimizing a difference between an optimized depth map and the depth map before being optimized and a difference between an optimized normal vector map and the normal vector map before being optimized, and an objective of minimizing an error between local planes determined from a same region in the optimized depth map and the optimized normal vector map, wherein the first confidence level and the second confidence level are weights to calculate the difference and the error; and
  outputting the optimized depth map and the optimized normal vector map by the optimizer.

2. The image processing method according to claim 1, wherein the performing of the joint optimization on the depth map and the normal vector map comprises:
  performing a following operation in a loop to iteratively optimize the depth map and the normal vector map until a current condition satisfy a preset condition to complete optimization:
  fixing the normal vector map and optimizing the depth map to minimize the difference between the optimized depth map and the depth map before being optimized, and to minimize an error between local planes determined from a same region in the optimized depth map and the normal vector map fixed; and
  fixing the depth map and optimizing the normal vector map to minimize the difference between the optimized normal vector map and the normal vector map before being optimized, and to minimize an error between local planes determined from a same region in the depth map fixed and the optimized normal vector map.

3. The image processing method according to claim 2, wherein the current condition satisfying the preset condition comprises at least one of:
  a current number of loops reaching a preset number; or
  the difference and the error determined in a current loop satisfying a preset threshold.

4. The image processing method according to claim 1, wherein the performing of the joint optimization on the depth map and the normal vector map comprises:
  extracting sample points from the same region in the optimized depth map and the optimized normal vector map; and
  fitting the local planes based on the sample points extracted from the optimized depth map and the optimized normal vector map.

5. The image processing method according to claim 1, further comprising:
  inputting the target image into a preset neural network to output the initial depth map, the first confidence level of the initial depth map, the initial normal vector map, and the second confidence level of the initial normal vector map by the preset neural network,
  wherein the preset neural network is trained in conjunction with the optimizer.

6. The image processing method according to claim 5, wherein the first confidence level and the second confidence level are obtained by making a prediction based on a feature extracted from an intermediate layer of the preset neural network.

7. The image processing method according to claim 5, wherein a process of training the preset neural network comprises:
  obtaining a sample image, as well as a depth map label and a normal vector map label of the sample image;
  inputting the sample image into the preset neural network to output a depth map and a normal vector map;

training the preset neural network in first stage training with an objective of minimizing a difference between the depth map output and the depth map label and a difference between the normal vector map output and the normal vector map label;

determining a first truth confidence level of the depth map output and a second truth confidence level of the normal vector map output based on the depth map and the normal vector map output at completion of the first stage training, as well as the depth map label and the normal vector map label;

inputting the depth map and the normal vector map output at the completion of the first stage training, as well as the first truth confidence level and the second truth confidence level, into the optimizer; and propagating output of the optimizer back to the preset neural network for second stage training of the preset neural network.

8. The image processing method according to claim 1, wherein the first confidence level is determined based on a depth re-projection error between the target image and an auxiliary image having a view angle difference from the target image.

9. An electronic device, comprising:

at least one processor; and a storage device configured to store at least one program that, when executed by the at least one processor, causes the at least one;

input an initial depth map of a target image, a first confidence level of the initial depth map, an initial normal vector map of the target image, and a second confidence level of the initial normal vector map into an optimizer;

perform joint optimization on a depth map and a normal vector map by the optimizer, with an objective of minimizing a difference between an optimized depth map and the depth map before being optimized and a difference between an optimized normal vector map and the normal vector map before being optimized, and an objective of minimizing an error between local planes determined from a same region in the optimized depth map and the optimized normal vector map, wherein the first confidence level and the second confidence level are weights to calculate the difference and the error; and output the optimized depth map and the optimized normal vector map by the optimizer.

10. A non-transitory storage medium comprising computer executable instructions that, when executed by a computer processor, causes the computer processor to:

input an initial depth map of a target image, a first confidence level of the initial depth map, an initial normal vector map of the target image, and a second confidence level of the initial normal vector map into an optimizer;

perform joint optimization on a depth map and a normal vector map by the optimizer, with an objective of minimizing a difference between an optimized depth map and the depth map before being optimized and a difference between an optimized normal vector map and the normal vector map before being optimized, and an objective of minimizing an error between local planes determined from a same region in the optimized depth map and the optimized normal vector map, wherein the first confidence level and the second confidence level are weights to calculate the difference and the error; and output the optimized depth map and the optimized normal vector map by the optimizer.

11. The electronic device according to claim 9, wherein the at least one program, when executed by the at least one processor, causes the at least one processor to:

perform a following operation in a loop to iteratively optimize the depth map and the normal vector map until a current condition satisfy a preset condition to complete optimization:

fixing the normal vector map and optimizing the depth map to minimize the difference between the optimized depth map and the depth map before being optimized, and to minimize an error between local planes determined from a same region in the optimized depth map and the normal vector map fixed; and fixing the depth map and optimizing the normal vector map to minimize the difference between the optimized normal vector map and the normal vector map before being optimized, and to minimize an error between local planes determined from a same region in the depth map fixed and the optimized normal vector map.

12. The electronic device according to claim 11, wherein the current condition satisfying the preset condition comprises at least one of:

a current number of loops reaching a preset number; or the difference and the error determined in a current loop satisfying a preset threshold.

13. The electronic device according to claim 9, wherein the at least one program, when executed by the at least one processor, causes the at least one processor to:

extract sample points from the same region in the optimized depth map and the optimized normal vector map; and fit the local planes based on the sample points extracted from the optimized depth map and the optimized normal vector map.

14. The electronic device according to claim 9, wherein the at least one program, when executed by the at least one processor, further causes the at least one processor to:

input the target image into a preset neural network to output the initial depth map, the first confidence level of the initial depth map, the initial normal vector map, and the second confidence level of the initial normal vector map by the preset neural network, wherein the preset neural network is trained in conjunction with the optimizer.

15. The electronic device according to claim 14, wherein the first confidence level and the second confidence level are obtained by making a prediction based on a feature extracted from an intermediate layer of the preset neural network.

16. The electronic device according to claim 14, wherein the at least one program, when executed by the at least one processor, causes the at least one processor to:

obtain a sample image, as well as a depth map label and a normal vector map label of the sample image;

input the sample image into the preset neural network to output a depth map and a normal vector map;

train the preset neural network in first stage training with an objective of minimizing a difference between the depth map output and the depth map label and a difference between the normal vector map output and the normal vector map label;

determine a first truth confidence level of the depth map output and a second truth confidence level of the normal vector map output based on the depth map and the normal vector map output at completion of the first stage training, as well as the depth map label and the normal vector map label;

input the depth map and the normal vector map output at the completion of the first stage training, as well as the first truth confidence level and the second truth confidence level, into the optimizer; and propagate output of the optimizer back to the preset neural network for second stage training of the preset neural network.

17. The electronic device according to claim 9, wherein the first confidence level is determined based on a depth re-projection error between the target image and an auxiliary image having a view angle difference from the target image.

18. The non-transitory storage medium according to claim 10, wherein the computer executable instructions, when executed by a computer processor, causes the computer processor to:

perform a following operation in a loop to iteratively optimize the depth map and the normal vector map until a current condition satisfy a preset condition to complete optimization:

fixing the normal vector map and optimizing the depth map to minimize the difference between the optimized depth map and the depth map before being optimized, and to minimize an error between local planes determined from a same region in the optimized depth map and the normal vector map fixed; and fixing the depth map and optimizing the normal vector map to minimize the difference between the optimized normal vector map and the normal vector map before being optimized, and to minimize an error between local planes determined from a same region in the depth map fixed and the optimized normal vector map.

19. The non-transitory storage medium according to claim 18, wherein the current condition satisfying the preset condition comprises at least one of:

a current number of loops reaching a preset number; or the difference and the error determined in a current loop satisfying a preset threshold.

20. The non-transitory storage medium according to claim 10, wherein the computer executable instructions, when executed by a computer processor, causes the computer processor to:

extract sample points from the same region in the optimized depth map and the optimized normal vector map; and fit the local planes based on the sample points extracted from the optimized depth map and the optimized normal vector map.

* * * * *